No. 830,803. PATENTED SEPT. 11, 1906.
A. RAICHE.
MACHINE FOR SETTING LACING HOOKS AND EYELETS.
APPLICATION FILED JUNE 15, 1905.

Witnesses
C. H. Garnett
J. Murphy

Inventor
Andrew Raiche
by Jas. H. Churchill
Attorney

No. 830,803. PATENTED SEPT. 11, 1906.
A. RAICHE.
MACHINE FOR SETTING LACING HOOKS AND EYELETS.
APPLICATION FILED JUNE 15, 1905.

Witnesses
C. H. Garnett
J. Murphy

Inventor
Andrew Raiche
by Jas. H. Churchill
Attorney

UNITED STATES PATENT OFFICE.

ANDREW RAICHE, OF QUINCY, MASSACHUSETTS.

MACHINE FOR SETTING LACING HOOKS AND EYELETS.

No. 830,803.

Specification of Letters Patent.

Patented Sept. 11, 1906.

Application filed June 15, 1905. Serial No. 265,304.

*To all whom it may concern:*

Be it known that I, ANDREW RAICHE, a citizen of the United States, residing in Quincy, in the county of Norfolk and State of Massachusetts, have invented an Improvement in Machines for Setting Lacing Hooks and Eyelets, of which the following description, in connection with the accompanying drawings, is a specification, like characters on the drawings representing like parts.

This invention has for its object to provide a machine with which eyelets, rivets, lacing-studs, and like devices may be set in the uppers of boots and shoes. For this purpose the machine is provided with means for punching the holes in the shoe-upper and with two sets of tools, one for setting the eyelets and the other for setting the lacing-studs, all operated from a main shaft of the machine, as will be described.

Provision is made for rendering inoperative one set of tools, such as the lacing-stud-setting tools, while the other set of tools, as the eyelet-setting tools, is in operation, and vice versa.

These and other features of this invention will be pointed out in the claims at the end of this specification.

Fig. 11, a detail in section and elevation of the operating-shafts and their cams, to be referred to;
Fig. 12, a detail of one clutch mechanism;
and Fig. 13, a detail in section, to be referred to.
The machine herein shown as embodying this invention comprises three sets of operating-tools, which may be designated the "punching set," the "hook set," and the "eyelet set," the punching set coöperating with both the hook and eyelet sets.

Figures 11, 12, 13:
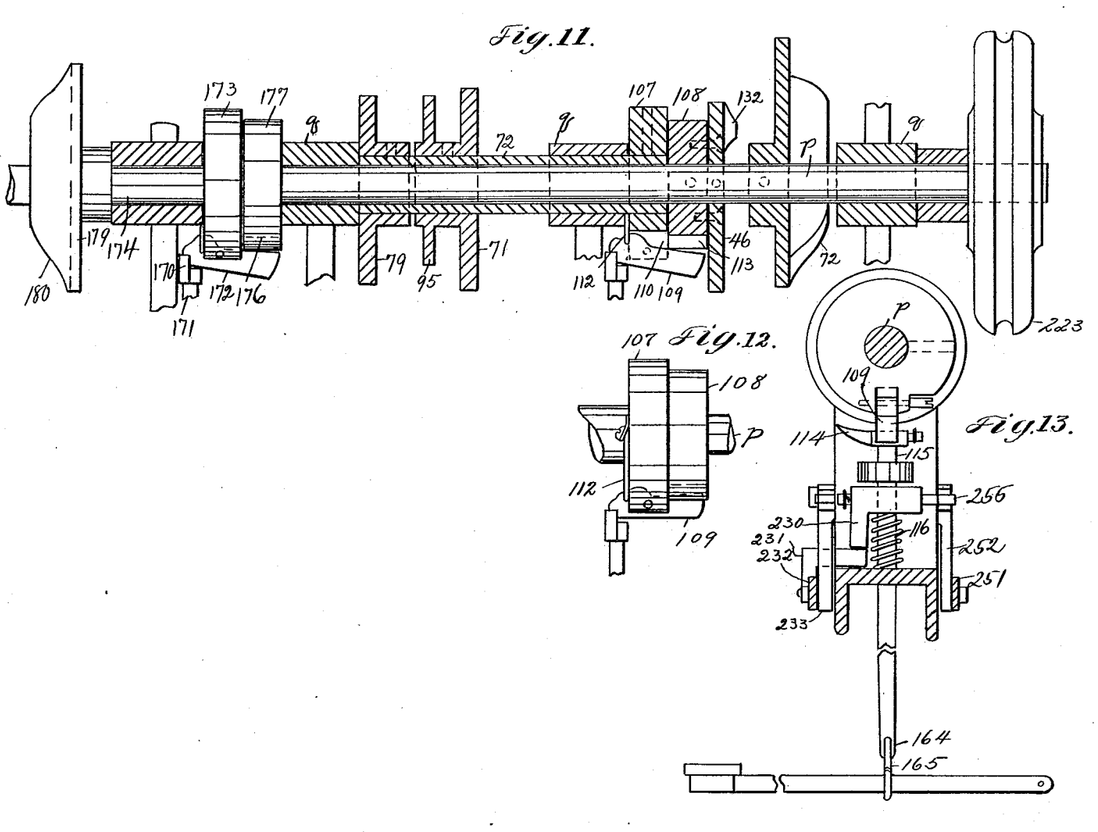

The punching set may be made as herein shown, and consists of an upper tool or punch $a$ and a lower tool or anvil $b$, secured, respectively, to upper and lower jaws made in the form of levers $c\,d$, (shown best in Figs. 1 and 4,) pivoted at $e$ to upright arms $f$ on a sliding carrier $g$, mounted to reciprocate in a guideway formed by guide-bars $h$, (see Fig. 1,) secured to a top plate or platform $i$, forming part of the framework of the machine. The carrier $g$ is moved in one direction—namely, to carry the punching-tools forward into their operative position with relation to the shoe-upper or work $j$, resting on a work-support or plate $k$, supported by a post $m$, erected upon the platform $i$ by a cam $n$ (see Figs. 1, 4, and 11) on the face of a disk $o$, fast on a shaft $p$, which may be designated the "main" shaft of the machine and which is supported below the platform $i$ in bearings $q$, erected from a base-plate $r$.

The face-cam $n$ is operatively connected with the carrier $g$, as herein shown, by means of a roller 20, carried by an arm 21 on a rocking sleeve or hub 22, provided with a second arm or crank 23, which is joined by a link 24 (see Fig. 1) to the bottom of the carrier $g$, so that in the revolution of the main shaft $p$ the cam $n$ turns the crank or arm 21 to the right (viewing Fig. 1) and rocks the sleeve 22, so as to slide the carrier forward toward the work-support. The carrier $g$ is returned to its normal or starting position by a spring 26, connected to the crank or arm 23. (See Figs. 2 and 4.)

Figure 4:
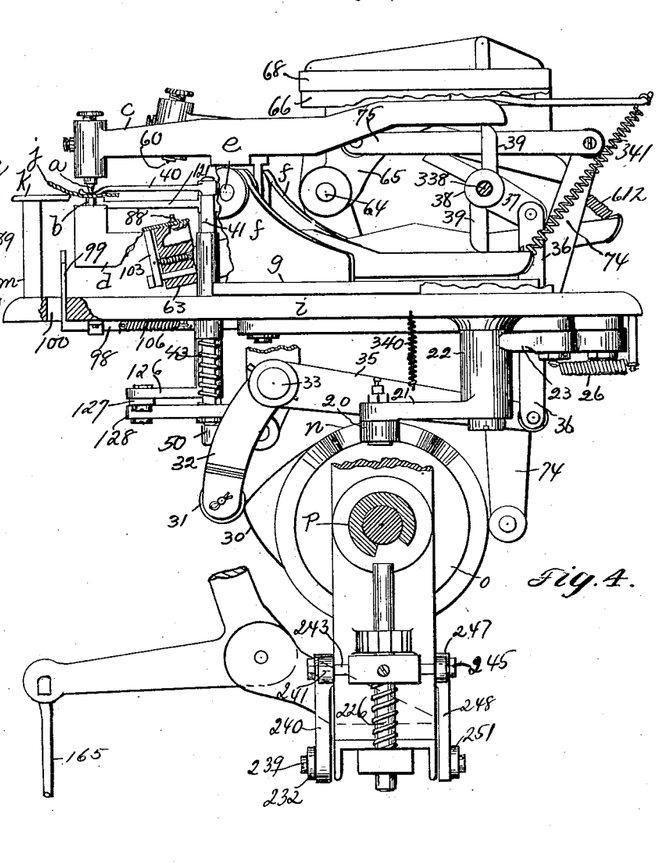
Fig. 4, a side elevation, with parts in section, of the machine shown in Fig. 1, looking toward the left.

During the forward movement of the carrier $g$ the punching-jaws $c\,d$ are open and pass one above and the other below the work $j$, and at or about the time the carrier has reached the end of its forward stroke the jaws $c\,d$ are closed to cause the punching-tools $a\,b$ to form a hole in the work. The closing of the punching-jaws $c\,d$ may be effected, as herein shown, by means of a peripheral cam 30 on the disk $o$, (see Fig. 4,) engaging a roller 31 on a crank or arm 32 on a rock-shaft 33, supported in a bearing 34, (see Fig. 1,) depending from the platform $i$, the said rock-shaft having a second crank or arm 35, joined by a link 36 to a crank 37 on a hub or sleeve 38, loose on a rod 338 and provided with cams or arms 39, which engage the rear end of the jaws or levers $c\,d$, as shown in Fig. 4, and thereby turn the said levers on their pivot $e$ to punch a hole in the work. After a hole has been punched in the work, as described, the punching-jaws are opened by the movement of the cams 39 from the substantially vertical position shown in Fig. 4 into a substantially horizontal position, and are withdrawn to their starting position by the backward movement of the carrier g, which is effected by the spring 26, as above described.

The cams 39 are turned in their horizontal position by the spring 340, connected with the crank or arm 35, and the levers c d are opened by the spring 341, connecting the rear ends of said levers. (See Fig. 4.) The main shaft p is rotated in a manner as will be described.

Figures 6, 7:
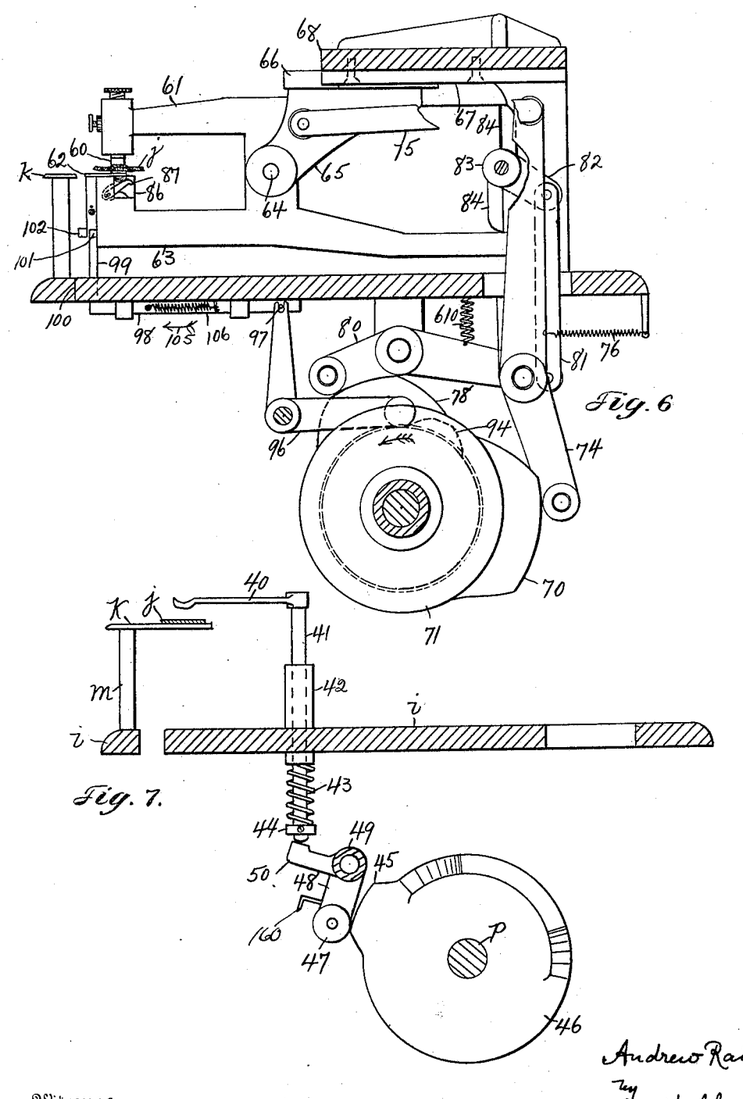
Fig. 6, a detail in section and elevation of the hook-setting mechanism.
Fig. 7, a detail in section of the presser.

While the hole is being punched in the work, the latter is firmly held down on the work table or plate k by a presser, (shown best in Fig. 7,) and consisting of a crank or arm 40 on a vertical rod 41, extended through a guide-tube 42, supported by the platform i, the said rod being extended below the platform and encircled by a spring 43, which acts against a collar 44 to hold the presser-arm 40 down upon the work j until positively raised therefrom by a cam 45 on the periphery of a disk 46, fast on the main shaft p, the said cam acting upon a stud or roller 47, carried by a crank 48 on a hub or sleeve 49, (see Fig. 7,) provided with a second crank or arm 50, upon which the presser-rod 41 rests. A hole having been punched in the material, let it be supposed that it is desired to insert the shank of a lacing-hook or stud therein and to fasten the same to the work. For this purpose the machine is provided with a hook-setting mechanism, which, as herein shown, comprises an upper tool or anvil 60, (see Figs. 1 and 6,) carried by an upper jaw or lever 61, and a lower tool or pocket-plate 62, carried by a lower jaw or lever 63, both of said jaws or levers being mounted on a common pivot 64 in arms 65, depending from a carrier 66, which slides in a guideway formed by guide-arms 67, attached to the under side of a plate 68, supported by uprights 69 directed upon the platform i. The carrier 66 is moved forward into its operative position by means of a cam 70 on a disk 71, (see Figs. 2, 6, and 11,) fast on a sleeve or hollow shaft 72, normally loose on the main shaft p, the said cam acting on a lever 74, joined by the link 75 to the carrier-arm 65. The backward movement of the carrier 66 is effected by a spring 76. (See Fig. 6.)

The jaws or levers 61 63 are closed in a manner similar to that above described with relation to the punching-jaws—namely, by a cam 78 on a disk 79, fast on the hollow shaft or sleeve 72, said cam acting on a lever 80, (see Fig. 6,) joined by a link 81 to a crank 82 on a cam-hub 83, provided with cams, cranks, or arms 84, which in their vertical position (shown in Fig. 6) close the jaws 61 63 and in their horizontal position permit said jaws to be opened by a spring 612 or otherwise.

The cams 84 are moved into their horizontal position by the spring 610, connected to the lever 80. The lower jaw or lever 63 is provided with an opening 86, (see Fig. 6,) in which is located a pivoted finger or dog 87, and which coöperates with the pocket-plate 62 to frictionally grasp the hook or stud 88 and retain it in its proper position on the lower setting-jaw 63. The studs or hooks 88 are fed one by one to the lower jaw 63 from a raceway 90 of any suitable or usual construction, which in practice will communicate with a suitable hopper, (not shown,) the said raceway being suitably supported from the platform i as by uprights 91, erected thereon.

Figure 1:
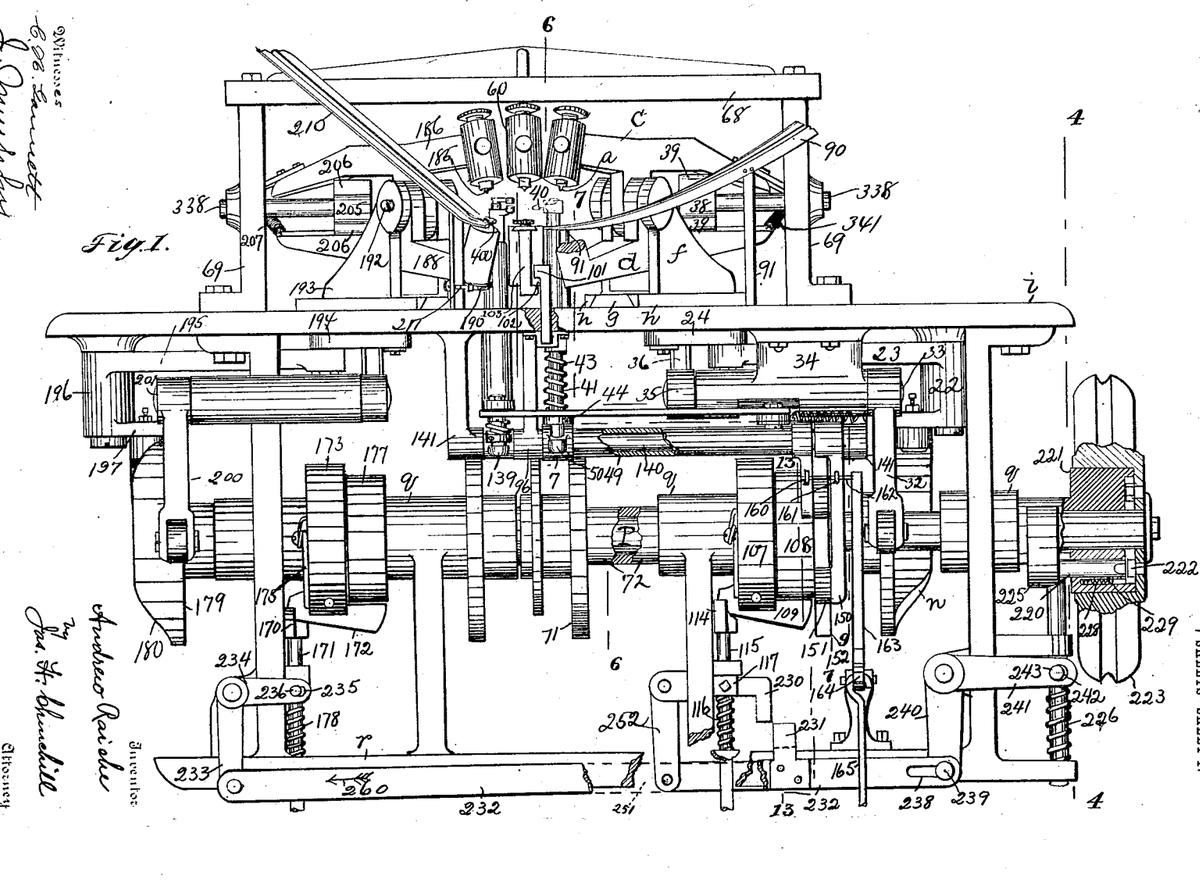
Figure 1 is a front elevation, with parts broken away, of a machine embodying this invention, parts of the machine being omitted to enable other parts to be more clearly shown.
Figure 2:
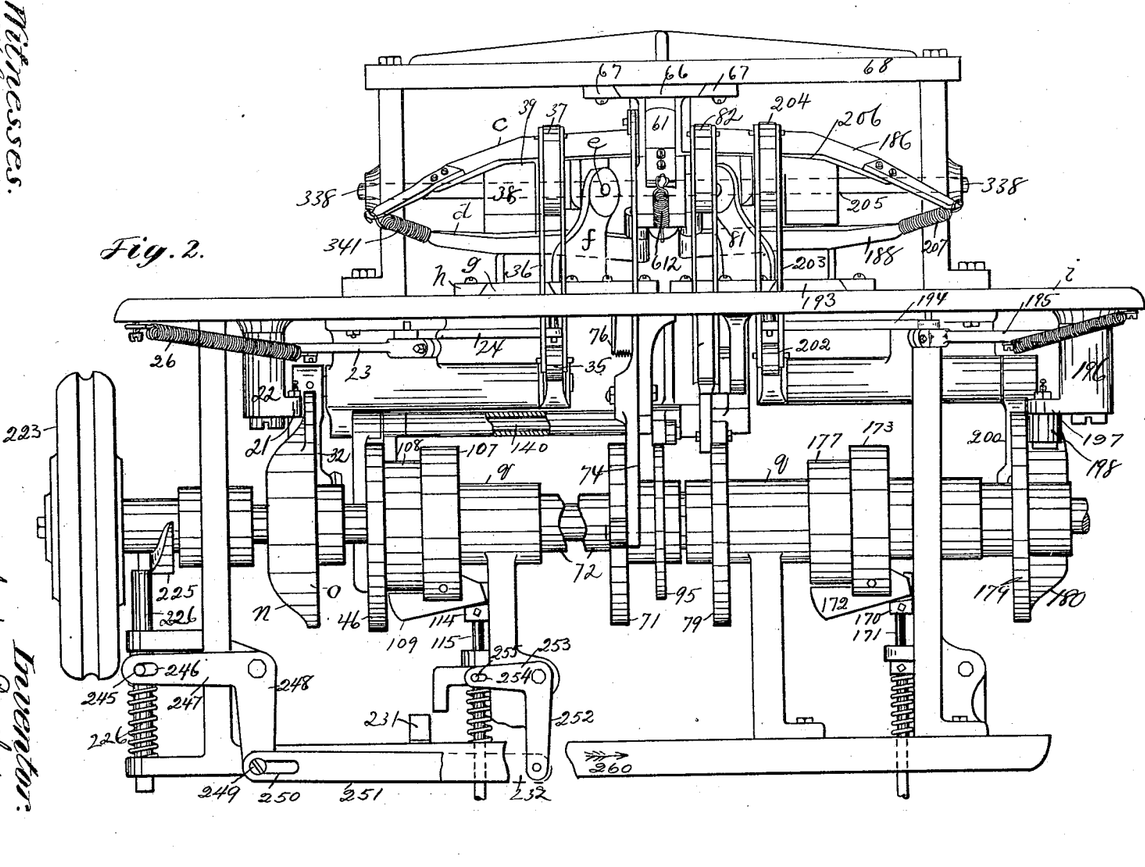
Fig. 2, a rear elevation of the machine shown in Fig. 1.
Figure 3:
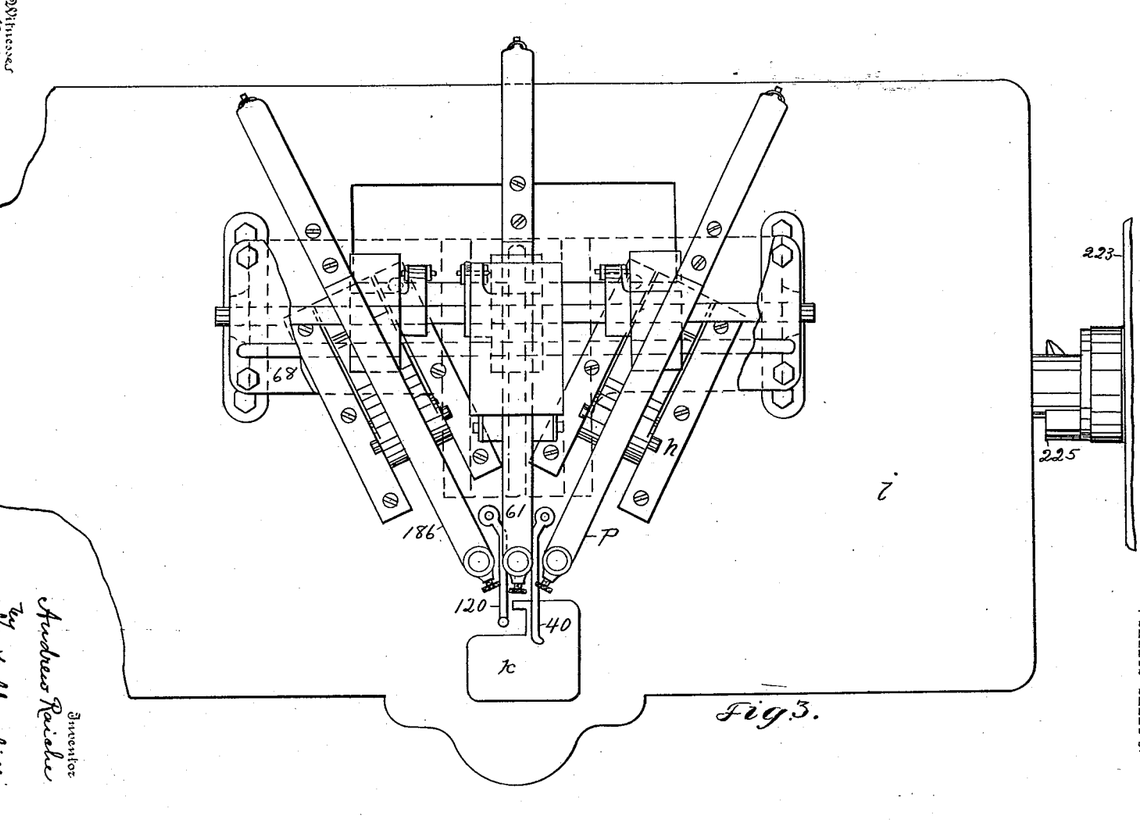
Fig. 3, a plan view of the machine shown in Fig. 1.

The lower jaw 63 coöperates with the raceway 90 to take a hook or stud therefrom when said jaw is in its backward position, the shank of the hook being uppermost, as represented in Fig. 4, so as to enter the hole in the work previously made by the punching set. When the jaws 61 63 are closed to set the hook in the work, the pocket-plate 62 engages the neck of the hook, and in order to permit the work to be fed forward, so that a new hole may be punched in the work, the said pocket-plate is withdrawn from engagement with the hook, which is effected by a cam 94 on a disk 95 on the hub of the disk 71, (see Fig. 6,) the said cam acting on a bell-crank lever 96, whose upper arm is slotted to engage a pin 97 on a sliding bar 98, provided with an upright arm 99, extended through a slot 100 in the platform i and provided with a finger 101, (see Fig. 1,) which engages a finger 102 on a bar 103, depending from the pocket-plate 62, when the lower jaw 63 is in its elevated or closed position shown in Fig. 6. When the jaw 63 is in its lowered position, the finger 102 is below and out of line with the finger 101, as shown in Fig. 1. When the cam 94 rocks the lever 96, the bar 98 is moved in the direction indicated by the arrow 105, Fig. 6, and by means of the fingers 101 102 moves the pocket-plate 62 in the same direction and withdraws the said plate from engagement with the hook or stud, and the jaws 61 63 at or about this time are opened, thus leaving the work free to be fed forward, as will be described.

Figure 8:
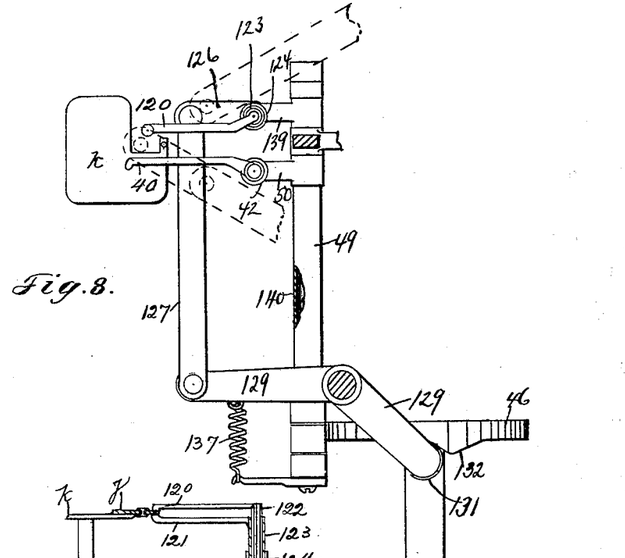
Fig. 8, a detail in plan of the presser and feed mechanism.

The bar 98 is moved in the direction opposite to that indicated by the arrow 105 by a spring 106. (See Fig. 6.) The cam-sleeve or hollow shaft 72 is normally loose on the main shaft p, but is adapted to be rendered fast thereon by a clutch mechanism, which may be made as herein shown and which comprises a collar 107, fast on the sleeve 72, (see Figs. 1 and 11,) a collar 108, fast on the main shaft, and a connecting dog or lever 109, which is pivoted in a slot 110 in the collar 107 and is adapted to have its free end forced by a spring 112 into a slot 113 in the collar 108. The lever 109 is normally disengaged from the slot 113 by the head 114 of a rod 115, (see Fig. 1,) which in practice may be connected to a foot-treadle, (not shown,) the rod 115 being normally elevated by a spring 116, encircling it between the base-plate $r$ and a collar 117 on said rod. The clutch mechanism just described may be designated the "hook" or "stud" clutch. After each hook or stud has been set in the hole previously made by the punching set the work $j$ is fed forward, which may be accomplished by a feed mechanism, which may be of the construction herein shown. (See Figs. 8 and 9.)

The work-feed mechanism herein shown comprises two fingers 120 121, adapted to engage the upper and lower surfaces of the work and which may be designated the "upper" and "lower" feed-fingers, respectively. The upper finger 120 is fast on a vertical shaft or rod 122, which is extended through a sleeve or hollow shaft 123, to which the lower finger 121 is secured. The sleeve 123 is extended through bearing-hubs 124 125 on the platform $i$, and has fast to its lower end a crank 126, which is joined by a link 127 to one arm 128 of a lever 129, pivoted at 130 to move in a substantially horizontal plane and carrying a roller 131, which is adapted to be engaged by a cam 132 on the face of the cam-disk 46 to effect movement of the lever 129 in one direction, and thereby through the crank 128, link 127, and crank 126 rotate the sleeve 123 and effect the feed of the work. The shaft 122 is connected to the sleeve 123 by the key 135, (see Fig. 10,) so as to rotate therewith and yet move longitudinally thereof to disengage the finger 120 from the work and release the latter to enable the feed mechanism to be returned by the spring 137 to its normal or starting position.

Figures 9, 10:
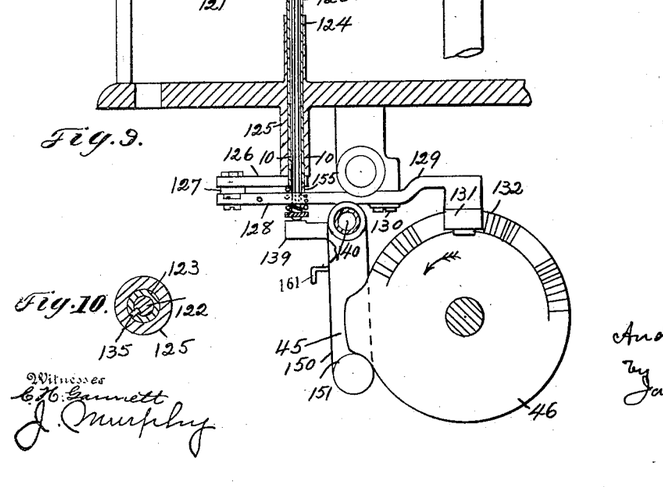
Fig. 9, a detail in section of the feed mechanism.
Fig. 10, a section on the line 10 10, Fig. 9.

The feed-finger 120 is moved longitudinally, as herein shown, by a crank or arm 139 (see Fig. 9, on a rock-shaft 140, supported in suitable bearings 141 (see Fig. 1) and upon which is loosely mounted the sleeve 49. The rock-shaft 140 has a second crank or arm 150, carrying a stud or roller 151, which is engaged by the cam 45 on the periphery of the disk 46, so as to rock the shaft 140 and elevate the crank 139 and the rod 122, so as to lift the finger 120 out of engagement with the work, the said finger being again engaged with the work when the cam 45 passes out of contact with the roller 151 by a spring 155. (See Fig. 9.)

The cam 45 constitutes the release-cam for the work-feed mechanism and also the release-cam for the presser 40. Provision is also made for manually lifting the upper feed-finger 120 and the presser 40 in order that the work may be properly positioned on the work table or plate $k$, and for this purpose the cranks 48 150 are provided with bent fingers 160 161, (see Figs. 1, 7, and 9,) which are engaged by a rod 162 on the upright arm 163 of a lever 164, which is connected by a link 165 with a foot-treadle. (Not shown.)

It will be understood that the punching set and the hook or stud setting mechanism operate alternately as long as it is desired to set hooks or lacing-studs. When, however, it is desired to set eyelets, the hook-clutch is released by the operator, the rod 115 is thereby elevated into its normal position shown in Fig. 1, and the clutch-dog 109 uncouples the hollow shaft 72 from the main shaft $p$, after which the eyelet-clutch treadle (not shown) is depressed to withdraw the head 170 on the stud 171 from engagement with the clutch-dog 172, which is pivoted in a slot in a collar 173, fast on a short shaft 174, arranged in line with the main shaft $p$, (see Fig. 11,) the said clutch-dog being adapted to be moved by a spring 175 into a slot 176 in a collar 177, fast on said main shaft. The rod 171 is normally elevated by the spring 178. (See Fig. 1.)

The shaft 174 has fast on it a cam-disk 179, provided with a face-cam 180 and with a peripheral cam 181, (see Figs. 1 and 5,) similar to the cams $n$ and 30, which operate the punching set, as above described.

The cam 180 effects movement of the eyelet-setting mechanism into its operative position, and the cam 181 effects the setting of the eyelet.

The eyelet-setting mechanism may be made as herein shown and consists of an upper tool or anvil 185, (see Fig. 5,) carried by an upper jaw or lever 186, and a lower tool comprising a plunger 187, carried by a lower jaw or lever 188, the said plunger being normally held depressed against the action of a spring 189 by a latch 190, which engages a head 191 on the lower end of said plunger.

The levers 186 188 are mounted on a pivot 192 on a reciprocating carrier 193, which slides in a suitable guideway in the platform $i$ and is connected by a link 194 to a crank 195 on a hollow rock-shaft or sleeve 196, provided with a second crank or arm 197, carrying a stud or roller 198, which is engaged by the cam 180.

Figure 5:
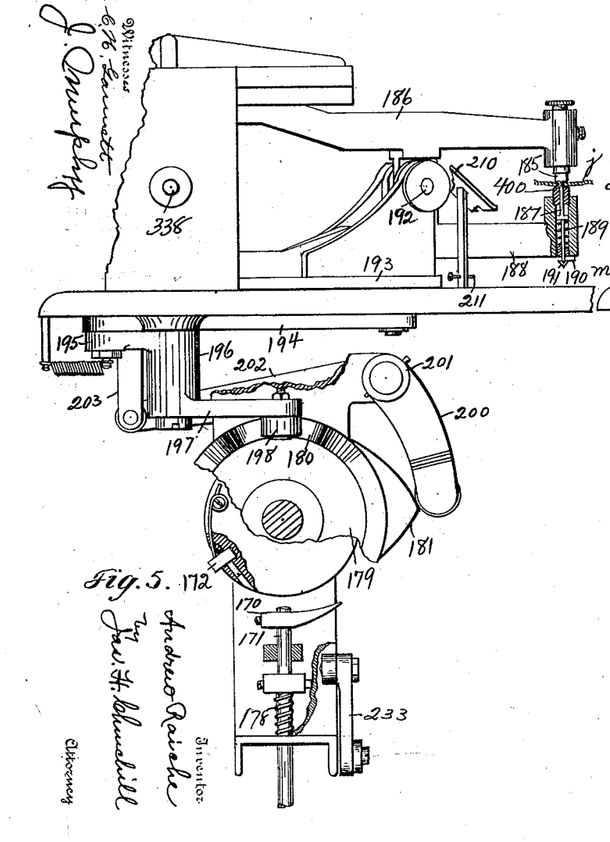
Fig. 5, a similar view looking toward the right in Fig. 1.

The setting levers or jaws 186 188 are closed and opened in a manner similar to that described with relation to the punching set, and for the purpose of closing the cam 181 acts on the crank 200 of a rock-shaft 201, provided with a second crank 202, (see Figs. 1, 2, and 5,) which is connected by links 203 to a crank 204 on a hub 205, mounted on the rod 338 and provided with oppositely-extended cams or arms 206, which close the setting-levers and effect the setting of the eyelet, as represented in Fig. 5. The setting-levers are opened by the spring 207. The cam 180 moves the setting jaws or levers from their backward or normal position (represented in Fig. 1) into their forward or operative position, (represented in Fig. 5,) which forward movement terminates with the setting-tools at the central point to which the punching-tools are moved. On the forward movement of the setting-jaws the plunger 187 takes an eyelet from the raceway 210 and carries it forward into line with the hole made by the punch. When the eyelet is set, which is effected by the upper tool 185 and the hollow anvil 400, through which the plunger 187 passes, the said plunger is depressed until the head 191 (see Fig. 5) passes by the latch 190, which latter is then moved by a suitable spring (not shown) over said head, thereby locking the plunger in its lowered position until it is again released, which occurs when the setting-jaws have reached the end of their backward movement, at which time the latch 190 engages a back-stop 211 and is disengaged from the head 191, whereupon the spring 189 moves the plunger 187 upward to engage an eyelet in the raceway.

The eyelet-setting machine is operated alternately with the punching mechanism as long as the eyelet-clutch 172 couples the shaft 174 to the main shaft $p$, which in the present instance is as long as the eyelet-treadle remains depressed.

It will be observed that the setting mechanisms are both operated from the main or driving shaft $p$, which is stationary when the machine is not in operation, but which is adapted to be set in rotation by a clutch of any suitable construction and which is herein shown as a pin 220, (see Fig. 1,) which slides in an opening in a collar or hub 221, fast on the shaft $p$, and coöperates with one or more pins or projections 222 on the inner face of a pulley 223, normally loose on the hub 221.

The clutch-pin 220 has attached to it a cam 225, (see Figs. 1 and 2,) which is adapted to engage a clutch-rod 226 to disengage the clutch member or pin 220 from the coöperating member 222 on the pulley. When the rod 226 is lowered, as will be described, the clutch-pin 220 is moved into the path of the revolving member 222 by a spring 228, acting upon a depending stud 229 on said pin.

It will be observed that the punching mechanism coöperates with both setting mechanisms, and inasmuch as all three mechanisms are moved to a common center or point provision is made for insuring the non-operation of one setting mechanism while the other is in operation. This result may be accomplished as herein shown, and for this purpose one setting-clutch-operating mechanism—as, for instance, the hook-clutch mechanism—has coöperating with it a stop or locking device for preventing said clutch being operated which stop or locking device is under control of the other setting-clutch mechanism.

In the present instance the clutch-rod 115 for the hook-setting mechanism has attached to it an arm or finger 230, (see Fig. 1,) which coöperates with an arm or projection 231 on a link or bar 232, pivotally connected at one end to a bell-crank lever 233, having its other arm 234 connected, as by a slot 235 and pin 236, to the clutch-rod 171 for the eyelet-setting mechanism. The link 232 at its opposite end is provided with a slot 238, into which extends a stud or pin 239 on a bell-crank lever 240, having its other arm 241 loosely connected by the slot 242 and pin 243 to the starting-clutch rod 226. The clutch-rod 226 has also connected to it by a pin 245 and slot 246 (see Fig. 2) a second bell-crank lever 247, having its arm 248 connected by a pin 249 and slot 250 to a link 251, which has its opposite end connected to a bell-crank lever 252, having its other arm 253 connected by the slot 254 and pin 255 to the clutch-rod 115.

As represented in Fig. 1, the stop or locking device 231 is out of line with the arm 230, attached to the hook-clutch rod 115, thereby leaving the latter free to be depressed. The downward movement of the clutch-rod 115 turns the bell-crank lever 252 in the direction indicated by the arrow 260, Figs. 1 and 2, and turns the bell-crank lever 247 so as to withdraw the rod 226 from engagement with the cam 225, thereby permitting the normally loose driving-pulley 223 to be clutched to the shaft $p$. At the same time the clutch dog or member 109 is operated to couple the hollow shaft 72 to the shaft $p$. The downward movement of the starting-clutch rod 226 turns the bell-crank lever 240; but owing to the length of the slot 238 this movement of said lever does not move the link 232 so as to effect the position of the locking arm or stop 231, which consequently does not interfere with the movement of the hook-clutch.

When the eyelet-treadle is operated, the downward movement of the rod 171 turns the lever 233 and moves the link 232 in the direction indicated by the arrow 260, Fig. 1, thereby turning the bell-crank lever 240 so as to depress the starting-clutch rod 226 and at the same time bringing the locking dog or arm 231 into line with the arm 230, thereby preventing operation of the hook-clutch. The downward movement of the clutch-rod 226 turns the bell-crank lever 247, but by reason of the slot 250 does not move the link 251.

When the eyelet-clutch is thrown out of operation by the spring 178, the link 232 is moved in the direction opposite to that indicated by the arrow 260 and the stop 231 is thereby moved out of line with the finger or arm 230.

In operation with the machine herein shown the work is placed on the work-support and the machine is set in operation by the operator depressing either the hook-clutch treadle or the eyelet-clutch treadle. Assume that the hook-clutch treadle is depressed. In this case the punching mechanism and the hook-setting mechanism are brought into operation, while the eyelet-setting mechanism remains idle or inactive. During the operation of the machine when used for setting hooks the punching mechanism is first operated to punch a hole in the work held upon the work-support and is then withdrawn, and the hook-setting mechanism is then operated to take a hook from its raceway, insert it in the hole fromed by the punching mechanism, and fasten or set the said hook in the work. The hook-setting mechanism is then withdrawn and the work-feed mechanism is operated to feed the work forward the proper distance to bring a new portion of the work into position to have the next hole formed in it, after which the operations of punching the hole and setting a hook therein are repeated. The alternate operations of punching a hole in the work and setting a hook therein are continued as long as the hook-clutch remains depressed.

When it is desired to set eyelets, the hook-clutch is released and the eyelet-clutch is brought into operation by the depression of its treadle. In this latter case the punching mechanism is operated to form a hole in the work, is withdrawn, and the eyelet-setting mechanism is operated to take an eyelet from its raceway and carry it forward to the work and set or fasten it in the hole formed by the punching mechanism. After the eyelet has been set the eyelet-setting mechanism is withdrawn and the work-feed operated to feed the work forward. The alternate operations of punching a hole in the work and setting an eyelet therein are repeated as long as the eyelet-clutch lever remains depressed. It will thus be seen that the work-feed mechanism is used with both kinds of setting mechanisms—that is, it is used with the hook-setting mechanism and also with the eyelet-setting mechanism.

From the above description it will be seen that the punching mechanism coöperates with both setting mechanisms and that all three constitute part of a single machine which is provided with means for rendering inoperative one setting mechanism while the other is in operation.

It will be also seen that by means of my invention hooks and eyelets may be set in the work while the latter is fed through the machine and that the setting of these two unlike devices is accomplished in a substantially continuous manner.

I have herein shown one construction of machine embodying this invention; but I do not desire to limit my invention to the particular construction shown.

I claim—

1. In a machine of the class described, in combination, a hook-setting mechanism and an eyelet-setting mechanism movable toward and from a common center, mechanism to operate each of said setting mechanisms, and means to prevent one of said setting mechanisms from operating while the other of said setting mechanisms is in operation.

2. In a machine of the class described, in combination, a punching mechanism, a reciprocating carrier therefor, a setting mechanism, a reciprocating carrier therefor, a second setting mechanism, a reciprocating carrier for said second setting mechanism, mechanism for reciprocating said punching and setting carriers toward and from a common center, and means for rendering the carrier of one of said setting mechanisms inoperative while the carrier for the other of said setting mechanisms is in operation, substantially as described.

3. In a machine of the class described, in combination, a platform provided with a guideway, a reciprocating carrier supported by said platform and sliding in said guideway, levers pivotally mounted on said sliding carrier, tools carried by said levers, means to reciprocate said carrier, and means to operate said levers to bring said tools into operation, substantially as described.

4. In a machine of the class described, in combination, mechanism to punch a hole in the work, mechanism to set a lacing hook or stud in said hole, mechanism to set an eyelet in a hole in the work formed by said punching mechanism, means to effect the operation of said mechanism, and means to render one of the setting mechanisms inoperative while the other is in operation, said punching mechanism coöperating with both of said setting mechanisms and operating alternately with one setting mechanism while the other setting mechanism is out of operation, substantially as described.

5. In a machine of the class described, in combination, mechanism to punch a hole in the work, mechanism to set a lacing hook or stud in said hole, mechanism to set an eyelet in a hole in the work formed by said punching mechanism, a main or driving shaft provided with means for operating the punching mechanism, a second shaft provided with means for operating one of the setting mechanisms, a third shaft provided with means for operating the other of said setting mechanisms, clutch mechanisms for operatively connecting said second and third shafts with said main shaft, means controlling the operation of said clutch mechanisms, and a locking device for one of said clutch mechanisms to prevent its operation while the other of said clutch mechanisms is in operation, substantially as described.

6. In a machine of the class described, in combination, mechanisms to punch a hole in the work, mechanism to set a lacing hook or stud in said hole, mechanism to set an eyelet in a hole in the work formed by said punching mechanism, said punching and setting mechanisms being movable toward and from a common point, a main shaft, and means for operatively connecting said mechanisms with said main shaft, substantially as described.

7. In a machine of the class described, in combination, a punching mechanism, a hook-setting mechanism, and an eyelet-setting mechanism movable toward and from a common center, and mechanism to operate each of said mechanisms.

8. In a machine of the class described, in combination, a punching mechanism, a hook-setting mechanism, an eyelet-setting mechanism movable toward and from a common point, means to feed the work to said setting mechanisms, and means to operate said setting mechanisms at the will of the operator while said work is being fed through the machine.

9. In combination, a punching mechanism, an eyelet-setting mechanism, a hook-setting mechanism movable toward and from a common point, a work-feed mechanism coöperating with both of said setting mechanisms to effect a feed of the work after the operation of either of said setting mechanisms, and means to operate said work-feed mechanism, substantially as described.

10. In combination, an eyelet-setting mechanism, means to control the operation of said eyelet-setting mechanism, a hook-setting mechanism, means to control the operation of said hook-setting mechanism, said setting mechanisms being movable toward and from a common point, and means to render one of said controlling means inoperative while the other controlling means is in operation, substantially as described.

11. In combination, a punching mechanism, an eyelet-setting mechanism, a hook-setting mechanism, said punching and setting mechanisms being movable toward and from a common center, and a presser-foot coöperating with both of said setting mechanisms to hold the work while each setting mechanism is operating and to release the same after the operation of each setting mechanism, substantially as described.

12. In a machine of the class described, in combination, mechanism to punch a hole in the work, mechanism to set a lacing hook or stud in said hole, mechanism to set an eyelet in a hole in the work formed by said punching mechanism, said punching and setting mechanisms being movable toward and from a common point, a main or driving shaft provided with means for operating the punching mechanism, a second shaft provided with means for operating one of the setting mechanisms, a third shaft provided with means for operating the other of said setting mechanisms, clutch mechanisms for operatively connecting said second and third shafts with said main shaft, and means controlling the operation of said clutch mechanisms substantially as described.

13. In a machine of the class described, in combination, mechanism to punch a hole in the work, mechanism to set a lacing hook or stud in said hole, mechanism to set an eyelet in a hole in the work formed by said punching mechanism, said punching and setting mechanisms being movable toward and from a common point, a main or driving shaft provided with means for operating the punching mechanism, a second shaft provided with means for operating one of the setting mechanisms, a third shaft provided with means for operating the other of said setting mechanisms, clutch mechanisms for operatively connecting said second and third shafts with said main shaft, means controlling the operation of said clutch mechanisms, and a locking device for one of said clutch mechanisms to prevent its operation while the other of said clutch mechanisms is in operation, substantially as described.

14. In a machine of the class described, in combination, a hook-setting mechanism, an eyelet-setting mechanism, a punching mechanism coöperating with both of said setting mechanisms, said mechanisms being movable toward and from a common point, and means to operate said parts, substantially as described.

15. In a machine of the class described, in combination, a main shaft, an auxiliary shaft, a hollow shaft loosely mounted on said main shaft, clutch mechanism for coupling said auxiliary and hollow shafts to said main shaft, mechanism to punch a hole in the work operatively connected with said main shaft, mechanism for setting a lacing hook or stud in said hole, mechanism for setting an eyelet in a hole in the work made by said punching mechanism, said setting and punching mechanisms being movable toward and from a common point, and means for operatively connecting said setting mechanisms with said hollow shaft and said auxiliary shaft, substantially as described.

16. In a machine of the class described, in combination, mechanism to punch a hole in the work, mechanism to set a lacing hook or stud in said hole, mechanism to set an eyelet in a hole in the work formed by said punching mechanism, means to effect the operation of said mechanisms, said mechanisms being movable toward and from a common point, and means to render one of the setting mechanisms inoperative while the other is in operation, said punching mechanism coöperating with both of said setting mechanisms and operating alternately with one setting mechanism while the other setting mechanism is out of operation, substantially as described.

17. In combination, a punching mechanism, an eyelet-setting mechanism and a hook-setting mechanism movable toward and from a common point, a work-feed mechanism coöperating with both of said setting mechanisms, and means to operate said work-feed mechanism, substantially as described.

18. In combination, a punching mechanism, an eyelet-setting mechanism, a hook-setting mechanism, said mechanisms being movable toward and from a common point, and a presser-foot coöperating with both of said setting mechanisms, substantially as described.

19. In a machine of the class described, in combination, two independent setting mechanisms movable toward and from a common center, a punching mechanism adapted to operate at said common center to punch holes in the work for the reception of devices set therein by said setting mechanisms, and means to operate said mechanisms.

In testimony whereof I have signed my name to this specification in the presence of two subscribing witnesses.

ANDREW RAICHE.

Witnesses:
JAS. H. CHURCHILL,
J. MURPHY.